United States Patent
Lee (10) Patent No.: US 12,191,992 B2
(45) Date of Patent: Jan. 7, 2025

(54) TERMINAL CONTROL APPARATUS AND METHOD

(71) Applicant: SK TELECOM CO., LTD., Seoul (KR)

(72) Inventor: Dong Jin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 371 days.

(21) Appl. No.: 17/707,095

(22) Filed: Mar. 29, 2022

(65) Prior Publication Data

US 2022/0224437 A1 Jul. 14, 2022

Related U.S. Application Data

(63) Continuation of application No. PCT/KR2020/015059, filed on Oct. 30, 2020.

(30) Foreign Application Priority Data

Oct. 30, 2019 (KR) .................. 10-2019-0136284

(51) Int. Cl.
*H04W 8/24* (2009.01)
*H04L 1/00* (2006.01)
*H04W 24/08* (2009.01)

(52) U.S. Cl.
CPC ............. *H04L 1/0025* (2013.01); *H04W 8/24* (2013.01); *H04W 24/08* (2013.01)

(58) Field of Classification Search
CPC ........ H04L 1/0025; H04W 8/24; H04W 24/08
See application file for complete search history.

(56) References Cited

U.S. PATENT DOCUMENTS

| 10,034,239 | B2* | 7/2018 | Kwon | ............... H04W 52/0212 |
| 2005/0192004 | A1* | 9/2005 | Witzel | .................. H04W 88/14 |
| | | | | 455/432.1 |
| 2011/0032879 | A1* | 2/2011 | Beaudin | ............. H04B 7/15542 |
| | | | | 370/328 |

(Continued)

FOREIGN PATENT DOCUMENTS

| AU | 2015297204 | 2/2017 |
| JP | 2019-041811 | 3/2019 |

(Continued)

OTHER PUBLICATIONS

International Search Report dated Jan. 26, 2021 issued in Application No. PCT/KR2020/015059.

*Primary Examiner* — Fahmida S Chowdhury
(74) *Attorney, Agent, or Firm* — KED & ASSOCIATES, LLP (57) ABSTRACT

A terminal control apparatus comprise: a transceiver that obtains information on a first terminal and a second terminal; and a processor that makes a predetermined determination in relation to each terminal's user based on the information obtained on the first terminal and the second terminal, that provides a result of the determination to the first terminal, and that, upon receiving role information including information on a role to be performed by the first terminal and information on a role to be performed by the second terminal, sets operation modes of the first terminal and the second terminal based on the received role information.

19 Claims, 6 Drawing Sheets

(56) References Cited

U.S. PATENT DOCUMENTS

2016/0011910 A1*  1/2016  Kang ................... G06F 9/5044
                                                    718/104
2021/0282003 A1*  9/2021  Li ......................... H04W 76/25
2021/0352468 A1* 11/2021  Huang .................. H04L 41/40
2022/0329292 A1* 10/2022  Kim ..................... H04B 7/264

FOREIGN PATENT DOCUMENTS

| KR | 10-2016-0008399 | 1/2016 |
| KR | 10-1667241 | 10/2016 |
| KR | 10-2017-0136759 | 12/2017 |
| KR | 10-2018-0034556 | 4/2018 |

* cited by examiner

| UE ID (PEI, IMSI, TMSI, IMEI, IMSI, MSISDN, etc) | Slice ID (SST / SD) | Service (Service Name, Service Operation, Attribute, Data Type, etc) | UE Radio Information (RAT Type, Frequency,) | Function 1, ..., N | Feature 1, ..., N | Resource (CPU, Memory, Storage, I/O, etc) |
|---|---|---|---|---|---|---|
| 1 FIRST TERMINAL | eMBB | ... | ... | Full Function, Full Processing | Encoding 방식, Pre-rendering, Encryption, Compression, | 80%, ... |
| 2 SECOND TERMINAL | mMTC | ... | ... | Small Data only, Light Processing | HMD Display, | 20%, ... |
| ... | ... | | | | ... | ... |
| | | | | | | |

FIG.6

TYPES OF COMMUNICATION INTERFACE

- PHYSICAL TYPE (EX: WIRED→USB TYPE, OPTIC CABLES, COPPER CABLES, ETC., WIRED-WIFI), PHYSICAL MODULES (EX: OPTICAL TRANSCEIVER, RJ45 TRANSCEIVER)
- PHYSICAL PORT POSITION (EX: PORT 1, PORT 2)
- PHYSICAL/LOGICAL COMBINATION INFORMATION (EX: COMBINATIONS OF FOUR 10GBE CABLES, ACTIVE-STANDBY /ACTIVE-ACTIVE REDUNDANCY STRUCTURE)
- LOGICAL IDENTIFICATION INFORMATION (EX: USB1, ETH1, WLAN1, BR1, ETC.)

SPEED OF COMMUNICATION INTERFACE

- BANDWIDTH (EX: BANDWIDTH 1GB/S, 10GB/S, ETC.)
- TRANSFER RATE (EX: THROUGHPUT 10MB/S, 1GB/S, ETC.)
- OVERALL RATE OF TRAFFIC BEING PROCESSED (EX: ENTIRE PDU SESSION AND FLOW OF ALL PACKETS IN SESSION)
- NUMBER OF SESSIONS BEING HANDLED, NUMBER OF FLOWS, RATE PER SESSION BEING HANDLED, AND RATE PER FLOW (EX: SESSION1=20MB/S, SESSION2=40MB/S, FLOW1=1MB/S, FLOW2=4MB/S)
- USAGE PER SESSION AND FLOW BEING HANDLED

LOAD OF COMMUNICATION INTERFACE

- INFORMATION ON STATUS OF RESOURCE LOAD WITHIN FIRST UE AND SECOND UE IN RELATION TO INTERFACE PROCESSING (EX: CPU/MEMORY/STORAGE)
- INFORMATION ON LOAD STATUS OF INTERFACE CONNECTED TO FIRST UE/SECOND UE IN RELATION TO INTERFACE PROCESSING (EX: PC5 INTERFACE)
- INFORMATION ON LOAD STATUS OF INTERFACE CONNECTED TO UE IN RELATION TO INTERFACE PROCESSING (EX: UU INTERFACE)
- EVENT STATUS INFORMATION FOR INTERFACE MESSAGE TYPES (EX: CAUSE. ERROR, RESUME, LOAD, OVERLOAD)

DELAY OF COMMUNICATION INTERFACE

- UNIDIRECTIONAL AND BIDIRECTIONAL DELAY VALUES
- UNIDIRECTIONAL AND BIDIRECTIONAL DELAY VALUES FOR EACH SESSION AND EACH FLOW
- UNIDIRECTIONAL AND BIDIRECTIONAL DATA SIZE TYPES FOR EACH SESSION AND EACH FLOW (EX: 64, 512, 1500 BYTES)
- TYPES AND NUMBER OF TRAFFIC DATA ERRORS FOR EACH SESSION AND EACH FLOW

FIG.7

| SET MAIN/SUB MODES | OPERATION EXAMPLE: WHEN INTERCONNECTION IS CUT OFF |
|---|---|
| FIRST TERMINAL PRIORITY MODE | · DISCONNECTED FROM SECOND TERMINAL (E.G., WHEN USER GOES OUT WITH FIRST TERMINAL (MOBILE PHONE) IN HAND, WITH SECOND TERMINAL (XR GLASSES) LEFT ON DESK AT HOME) |
| SECOND TERMINAL PRIORITY MODE | · FULL FUNCTIONS OF SECOND TERMINAL ARE TURNED ON (E.G., WHEN USER GOES OUT WEARING SECOND TERMINAL (XR GLASSES), WITH FIRST TERMINAL (MOBILE PHONE) LEFT ON DESK AT HOME) |
| ANY TERMINAL PRIORITY MODE | · FULL FUNCTIONS OF BOTH TERMINALS ARE TURNED ON, WHETHER FIRST TERMINAL OR SECOND TERMINAL |

TERMINAL CONTROL APPARATUS AND METHOD

CROSS-REFERENCE TO RELATED APPLICATION

This application is a continuation of PCT Patent Application No. PCT/KR2020/015059, filed Oct. 30, 2020, which claims priority to Korean Patent Application No. 10-2019-0136284, filed Oct. 30, 2019, whose entire disclosures are hereby incorporated by reference.

TECHNICAL FIELD

The present disclosure relates to a terminal control apparatus and method.

BACKGROUND

In the standards dealing with the next-generation 5G (hereinafter, referred to as "B5G") technology, research for controlling media or cloud rendering or XR (a concept that encompasses VR (virtual reality) and AR (augmented reality) is being discussed. For example, the following use cases have emerged according to these standards.

NCIS Service Supporting
New Requirements for VR Based NCIS Service
Cloud Rendering for Games
High Speed Scenario
IoE Based Social Networking
Communication within NCIS group In this context of B5G, the requirement that there must be a distinction between the role of a network and the role of a terminal depending on the characteristics or type of the terminal is becoming demanding. This requirement is becoming increasingly demanding especially in fields such as smart factory, vertical industry, or V2X communications.

Along with this requirement, there are some considerations to be made about sub-terminals such as AR glasses as well as main terminals such as smartphones. For example, resources or processing capabilities the sub-terminals can offer, the battery performance of the sub-terminals, and even radio resources the sub-terminals will use need to be taken into account.

SUMMARY

An aspect of the present disclosure is to provide a technology that provides efficient control of a first terminal such as a smartphone and a second terminal operating as a sub for the first terminal.

For example, a technology for making efficient use of radio resources when the first terminal and the second terminal communicate with a network, a technology for controlling the first terminal and the second terminal in a situation where the second terminal is surpassed by the first terminal in terms of resources or processing capabilities that can be offered or in terms of battery performance.

The aspects of the present disclosure are not limited to the foregoing, and other aspects not mentioned herein will be clearly understood by those skilled in the art from the following description.

In accordance with an aspect of the present disclosure, there is provided a terminal control apparatus, the apparatus comprise: a transceiver that obtains information on a first terminal and a second terminal; and a processor that makes a predetermined determination in relation to each terminal's user based on the information obtained on the first terminal and the second terminal, that provides a result of the determination to the first terminal, and that, upon receiving role information including information on a role to be performed by the first terminal and information on a role to be performed by the second terminal, sets operation modes of the first terminal and the second terminal based on the received role information.

The processor may determine whether or not a subscriber of the first terminal and a subscriber of the second terminal are the same person based on the obtained information.

The processor may provide terminal information of the second terminal to the first terminal by using the transceiver, in addition to the result of the determination.

The processor may provide to the first terminal an indication that the first terminal performs a main role and the second terminal performs a sub role by using the transceiver, in addition to the result of the determination.

The processor may receive ratio information including information on a ratio of resources to be distributed when the first terminal and the second terminal perform roles, by using the transceiver along with role information including information on the role to be performed by the first terminal and information on the role to be performed by the second terminal.

The processor may set the operation modes of the first terminal and the second terminal so that the second terminal communicates with the terminal control apparatus through the first terminal, based on the received role information.

The obtained information may comprise at least one of terminal location, Application ID, slice ID (SST, SD), IMSI (International Mobile Subscriber Identity), SUPI (Subscription Permanent Identifier), GPSI (Generic Public Subscription Identifier), MSISDN (Mobile Station International Subscriber Directory Number), PDU session information, radio capability information, RAT (Radio Access Technology) information, Single/Dual-Registration operation mode, DRX information, and communication interface information.

The processor may change the operation modes of the first terminal and the second terminal, based on connection status information received from the first terminal, indicating that a connection status between the first terminal and the second terminal is below a predetermined level.

The connection status information may be periodically received from the first terminal, and the processor periodically monitors the connection status between the first terminal and the second terminal based on the periodically received connection status information.

The changed operation mode of the second terminal may comprise an operation mode in which the second terminal communicates with the terminal control apparatus without the medium of the first terminal.

The changed operation mode of the second terminal may comprise an operation mode in which the second terminal communicates with the terminal control apparatus via a different network from the network the first terminal uses to communicate with the terminal control apparatus.

The processor may re-change the operation modes of the first terminal and the second terminal, when the connection status between the first terminal and the second terminal is changed from below the predetermined level to the predetermined level or above.

The changed operation mode of the first terminal and the changed operation mode of the second terminal may be determined based on a value from a motion sensor comprised in the first terminal or the second terminal.

In accordance with another aspect of the present disclosure, there is provided a terminal control method, the method comprise: making a predetermined determination in relation to each terminal's user based on the information obtained on the first terminal and the second terminal; providing a result of the determination to the first terminal; and upon receiving role information including information on a role to be performed by the first terminal and information on a role to be performed by the second terminal, setting operation modes of the first terminal and the second terminal based on the received role information.

In accordance with another aspect of the present disclosure, there is provided a non-transitory computer-readable recording medium storing a computer program, which comprises instructions for a processor to perform a terminal control method, the terminal control method comprise: making a predetermined determination in relation to each terminal's user based on the information obtained on the first terminal and the second terminal; providing a result of the determination to the first terminal; and upon receiving role information including information on a role to be performed by the first terminal and information on a role to be performed by the second terminal, setting operation modes of the first terminal and the second terminal based on the received role information.

According to an embodiment, the first terminal and the second terminal may distribute and perform predetermined roles. In this case, no radio resources are needed for the second terminal, which enables efficient use of radio resources. Besides, in a situation where the second terminal is generally surpassed by the first terminal in terms of resources or processing capabilities that can be offered or in terms of battery performance, some of the original roles of the second terminal may be distributed with or transferred to the first terminal. Therefore, the second terminal's limitations in resources or capabilities may be overcome or improved.

BRIEF DESCRIPTION OF THE DRAWINGS

FIG. 6 shows an example of connection status information according to an embodiment of the present disclosure.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
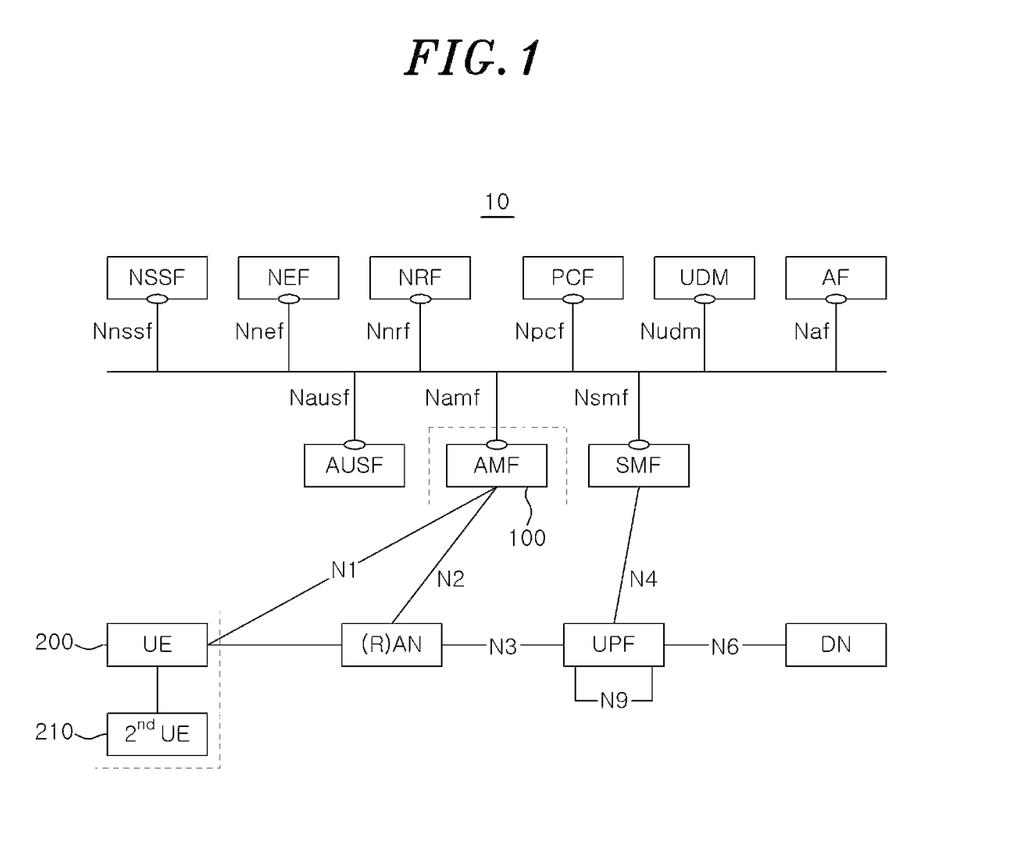
FIG. 1 illustrates part of an architecture for a 5G system according to an embodiment of the present disclosure.

FIG. 1 illustrates part of an architecture for a 5G system according to an embodiment of the present disclosure.

The 5G system in the architecture 10 illustrated in FIG. 1 will be described. The 5G system is an advanced technology from the 4th generation LTE telecommunication technology. The 5G system is a new Radio Access Technology (RAT) and an expanded technology of Long Term Evolution (LTE) through an evolution of an existing mobile communication network structure or a clean-state structure, and supports extended LTE (eLTE), non-3GPP access, and the like.

However, the architecture 10 illustrated in FIG. 1 is only exemplary, so the idea of the present disclosure is not construed as being limited to what is illustrated in FIG. 1 nor to the 5G system. Although the architecture for the 5G system is described in FIG. 1, the present disclosure is not limited to this.

The architecture 10 includes various components—that is, network functions (NF). For example, a Policy Control Function (PCF), a (core) Access and Mobility Management Function (AMF) 100, a Network Repository Function (NRF), a Session Management Function (SMF), and a User Plane Function (UPF) are illustrated.

Besides, the architecture 10 may include a Data Network (DN), a (Radio) Access Network ((R)AN or a base station), a Network Data Analytics Function (NWDAF), etc., and also may include a first terminal 200 and a second terminal 210.

Here, the PCF, the AMF 100, the NRF, the SMF, the UPF, etc. are interconnected via an interface referred to as service-based interface (SBI) 600.

Among them, the PCF, the AMF 100, the NRF, and the SMF are components included in a user plane in the 5G system, and the AMF 100 may be referred to as terminal control device which will be described later. Moreover, the UPF is a component included in a user plane.

Examples of the first terminal 200 may include, but not limited to, a smartphone and a smart pad. The first terminal 200 may connect to networks such as 4G, LTE-A, 5G, and B5G.

Additionally, the second terminal 210 may be connected to the first terminal 200 to access the aforementioned networks, or may directly connect to the aforementioned networks. Examples of the second terminal 210 may include, but not limited to, AR/VR glasses, a wearable device, and a drone.

Figure 2:
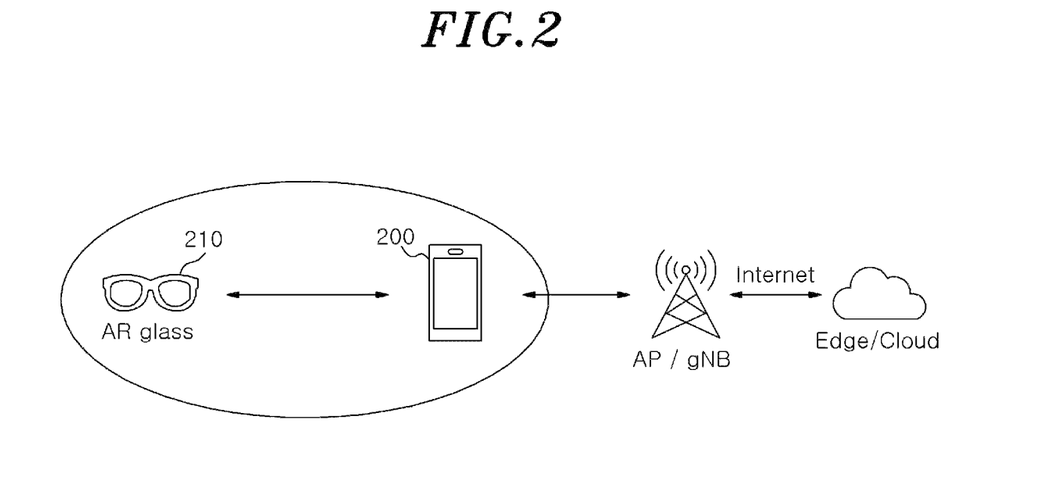
FIG. 2 is a view schematically showing part of a 5G system to which a technology according to an embodiment of the present disclosure is applied.

FIG. 2 schematically illustrates the above-described first terminal 200, second terminal 210, base station (AP/gNB), and networks (Edge/Cloud). Referring to FIG. 2, AR/VR glasses are illustrated as an example of the second terminal 210, and a smartphone is illustrated as an example of the first terminal 200. The second terminal 210 is connectable to the first terminal 200 via a wireless or wired interface (e.g., USB, UE-to-UE PC5 I/F, WiFi, Bluetooth, NFC, Ethernet, etc.). The second terminal 210 may connect to a network via the first terminal 200 in a state connected with the first terminal 200, or may connect to a network directly without the medium of the first terminal 200. However, the illustration in FIG. 2 is only exemplary.

Figure 3:
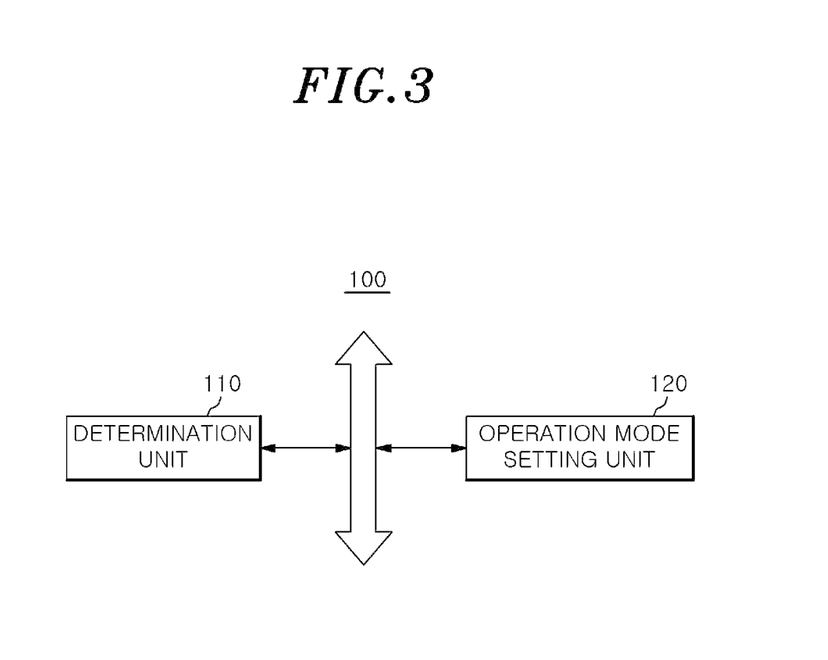
FIG. 3 illustrates an exemplary configuration of a terminal control apparatus according to an embodiment of the present disclosure.

FIG. 3 is a schematic diagram of a terminal control apparatus 100 according to an embodiment of the present disclosure. Although the schematic diagram of the terminal control apparatus 100 is described in FIG. 3, the present disclosure is not limited to this.

First, the terminal control apparatus 100 may be implemented in the Access and Mobility Management Function (AMF).

Referring to FIG. 3, the terminal control apparatus 100 may include a determination unit 110 and an operation mode setting unit 120. Moreover, the terminal control apparatus 100 and the components included in it, that is, the determination unit 110 and operation mode setting unit 120, may be implemented by a memory that stores instructions programmed to execute functions to be described below and a microprocessor that executes these instructions.

The terminal control apparatus 100 may further include a transceiver (not shown). The terminal control apparatus 100 may transmit and receive information to and from the first terminal 200, the second terminal 210, the NF 300, and/or the SMF/UPF/NFs 500 by using the transceiver (not shown). For example, as will be described later, the terminal control apparatus 100 may perform functions such as receiving terminal information from the first terminal 200 and the second terminal 210, receiving additional terminal information from the NF 300, and communicating with the SMF/UPF/NFs 500 for PDU session handling.

The determination unit 110 is configured to make a predetermined determination in relation to each terminal's user based on the information obtained on the first terminal 200 and the second terminal 210. For example, the determination unit 110 may determine whether or not a subscriber of the first terminal 200 and a subscriber of the second terminal 210 are the same person.

The determination unit 110 may make a determination based on various information, for example, terminal information provided from the first terminal 200 or the second terminal 210, or information provided from at least one of the NFs (PCF (Policy Management Function), AF (Application Function), NEF (Network Exposure Function), UCMF (UE radio Capability Management), PMF (Performance Management Function), or UDM (Unified Data Management)) within a core network.

Besides, the determination unit 110 may determine whether or not the first terminal 200 and the second terminal 210 are located within a predetermined distance from each other. To this end, the determination unit 110 may obtain location information of the first terminal 200 and location information of the second terminal 210, and, based on this information, determine whether or not the first terminal 200 and the second terminal 210 are located within a predetermined distance from each other.

Herein, the terminal information may include at least one of terminal location, Application ID, slice ID (SST, SD), IMSI (International Mobile Subscriber Identity), SUPI (Subscription Permanent Identifier), GPSI (Generic Public Subscription Identifier), MSISDN (Mobile Station International Subscriber Directory Number), PDU session information, radio capability information, RAT (Radio Access Technology) information, Single/Dual-Registration operation mode, DRX information, and communication interface information. In this instance, if the subscribers of the two terminals are the same person, the terminal information may be exactly the same, or otherwise, for example, the terminals may have a predetermined number of different last digits for their 10-digit number and the other digits in common.

Next, the operation mode setting unit 120 will be described. The operation mode setting unit 120 is configured to set or change the operation modes of the first terminal 200 and the second terminal 210, respectively.

The operation mode setting unit 120 will be described in more detail.

Before the operation mode setting unit 120 sets the operation modes of the first terminal 200 and the second terminal 210, the first terminal 200 and the second terminal 210 may operate to connect to a network, for example, the terminal control apparatus 100, individually or independently. In this state, the operation modes of the first terminal 200 and the second terminal 210 are referred to as "independent modes".

On the other hand, the operation mode setting unit 120 may set the operation modes of the first terminal 200 and the second terminal 210 to "interconnection mode". In the interconnection mode, the second terminal 210 may connect to the terminal control apparatus 100 through the first terminal 200. Also, in the interconnection mode, the first terminal 200 and the second terminal 210 may distribute and perform predetermine roles, that is, operate in conjunction with each other. In this case, since the second terminal 210 connects to a network through the first terminal 200, no radio resources are needed for the second terminal 210, which enables efficient use of radio resources. Besides, in a situation where the second terminal 210 is generally surpassed by the first terminal 200 in terms of resources or processing capabilities that can be offered or in terms of battery performance, some of the original roles of the second terminal 210 may be distributed with or transferred to the first terminal 200. Therefore, the second terminal 210's limits in resources or capabilities may be overcome or improved.

Meanwhile, even when the operation modes of the first terminal 200 and the second terminal 210 are set to the interconnection mode, the operation mode setting unit 120 may set the operation modes of the first terminal 200 and the second terminal 210 back to the independent mode, as long as a predetermined condition is met. For example, the operation mode setting unit 120 may determine that the first terminal 200 and the second terminal 210 are located at a distance from each other or are not within a short distance from each other, based on information on the movement of each terminal obtained from the first terminal 200 and the second terminal 210, that is, information on the acceleration, gyroscope, geomagnetic field, pressure, light, proximity, gravity, orientation, compass, temperature, and humidity measured by various kinds of sensors embedded in each terminal. If it is determined that these terminals are spaced apart from each other or are not within a short distance from each other, the operation mode setting unit 120 may set the operation modes of these terminals back to the independent mode.

Details of the operation mode setting unit 120 will be described in more detail with reference to FIG. 4.

Figure 4:
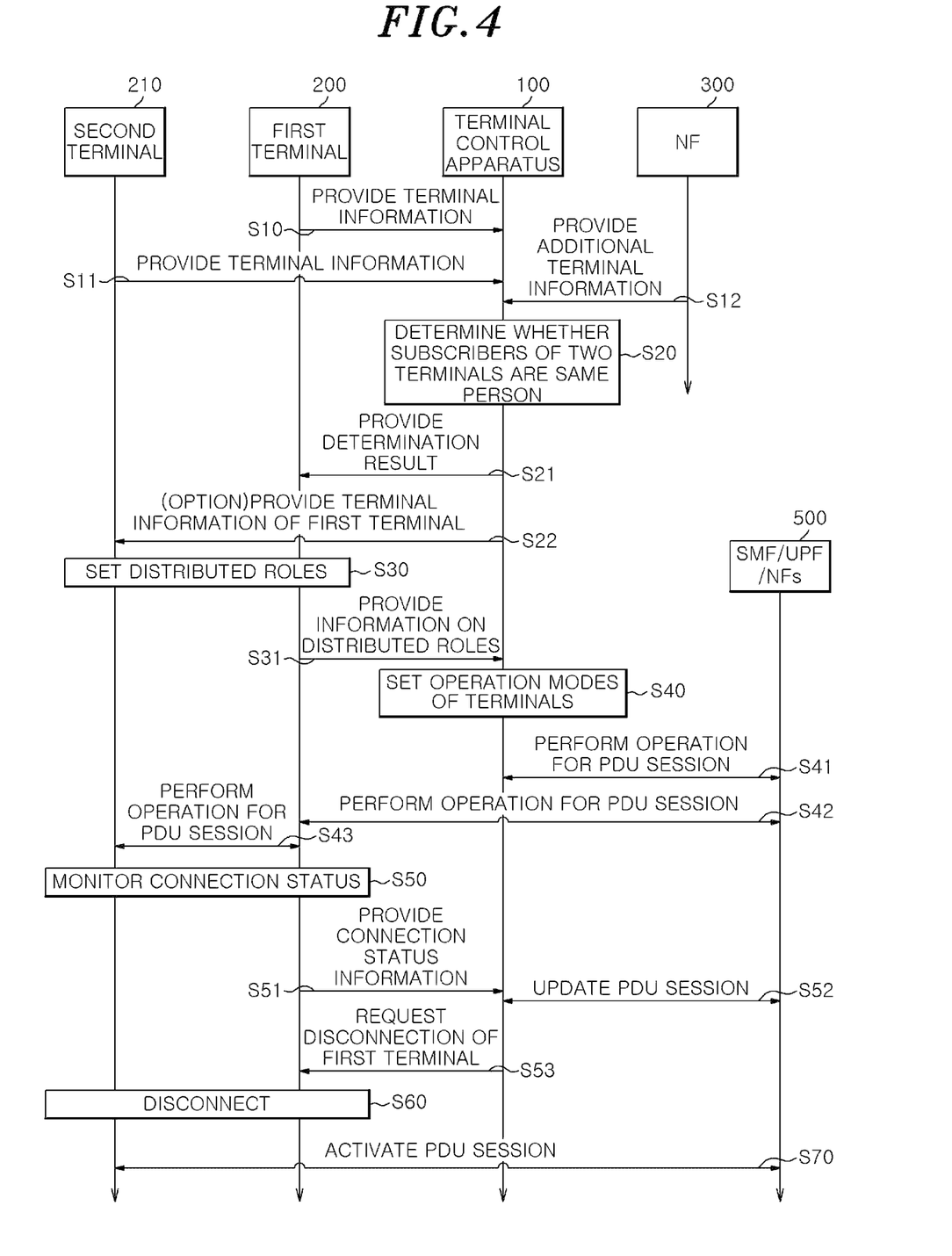
FIG. 4 is an exemplary view of a procedure of a terminal control method according to an embodiment of the present disclosure.

FIG. 4 is an exemplary view of a procedure of a terminal control method according to an embodiment of the present disclosure.

Although the procedure of a terminal control method is described in FIG. 4, the present disclosure is not limited to this.

First, the terminal control method may be performed by the above-described terminal control apparatus 100.

The first terminal 200 and the second terminal 210 may make an initial registration on the terminal control apparatus 100 or make a service request to it. In this process, the first terminal 200 and the second terminal 210 provide terminal information to the terminal control apparatus 100 (S10, S11).

Then, the terminal control apparatus 100 may receive additional terminal information, corresponding to the terminal information received in S10 and S11, from the NF 300, for example, the PCF, the AF, the NEF, the NWDAF, the PMF (Performance Management Function), etc. (S12). Here, S12 may not be performed in some embodiments.

The terminal information is also referred to as UE capability, and may include at least one of Application ID, terminal location, slice ID, IMSI (International Mobile Subscriber Identity), SUPI (Subscription Permanent Identifier), GPSI (Generic Public Subscription Identifier), (MSISDN, Mobile Station International Subscriber Directory Number) PDU session ID, radio capability, RAT (Radio Access Technology), operation mode, DRX information, and communication interface information.

As described previously, the determination unit 110 of the terminal control apparatus determines whether or not a subscriber of the first terminal 200 and a subscriber of the second terminal 210 are the same person (S20). For example, if the location, slice ID, and MSISDN of the first terminal 200 are identical to those of the second terminal 210, the determination unit 110 may determine that the subscriber of the first terminal 200 and the subscriber of the second terminal 210 are the same person.

Besides, the determination unit 110 may determine which terminal performs a main role and which terminal performs a sub role, between the first terminal 200 and the second terminal 210. The above-described terminal information may be used, too, in making such a determination. The following description will be given on the assumption that the first terminal 200 performs the main role and the second terminal 210 performs the sub role.

If it is determined that they are not the same person in S20, the first terminal 200 and the second terminal 210 operate individually or independently.

On the other hand, if it is determined that they are the same person in S20, the operation mode setting unit 120 of the terminal control apparatus 100 may then provide a result of the determination in S20 to the first terminal 200 (S21). In this instance, in S21, the terminal information of the second terminal 210 and an indication of which terminal performs the main role and which terminal performs the sub role may be transmitted to the first terminal 200. Here, the terminal information of the second terminal 210 may include information on a communication interface (for example, LTE, 5G, WiFi, or Bluetooth) between the second terminal 210 and the first terminal 200.

Moreover, in some embodiments, the operation mode setting unit 120 of the terminal control apparatus 100 may send the terminal information on the first terminal 200 to the second terminal 210 (S22). In this instance, in S22, an indication that the first terminal 200 performs the main role and the second terminal 210 performs the sub role may be transmitted to the second terminal 210. Thus, the second terminal 210 communicates with the terminal control apparatus 100 only through the first terminal 200 unless a specific condition is met.

The first terminal 200 and the second terminal 210 distribute the roles based on the information received in S21 and S22 and also share that information (S30). In the process of distributing the roles, resources (CPU, memory, storage, I/O) of the terminals 200 and 210 or communication resources (Ethernet, WiFi, NFC, Bluetooth, USB, 3G, 4G, 5G, etc.) of the terminals 200 and 210 may be taken into consideration. For example, the first terminal 200 and the second terminal 210 may distribute the roles in such a way that the ratio of the CPU occupancy of the first terminal 200 to the CPU occupancy of the second terminal 210 is 8:2, and the ratio of the memory consumption of the first terminal 200 and the memory consumption of the second terminal 210 is 6:4.

Here, the roles may be distributed by determining which terminal between the first terminal 200 and the second terminal 210 performs which function (hereinafter, also referred to as "funcN") handled through each application. For example, let's assume that there is an application related to a head-mounted display, and that this application contains five functions: func1, func2, func3, func4, and func5. Then, through the distributing of the roles, the first terminal 200 may be in charge of func1 to func4, and the second terminal 210 may be in charge of func5. Alternatively, the first terminal 200 may be in charge of func1 to func4, and the second terminal 210 may be in charge of func4 and func5. That is, both the first terminal 200 and the second terminal 210 may perform func4 together.

As for the distributing of the roles, the total amount of resources required to handle a given session may be pre-recorded and then all of the resources may be distributed later at a predetermined ratio, but the distributing method is not limited to this. Alternatively, the roles may be distributed in such a way that the second terminal 210 only performs displaying and the first terminal 200 performs rendering, preprocessing, etc. for display.

Figure 5:
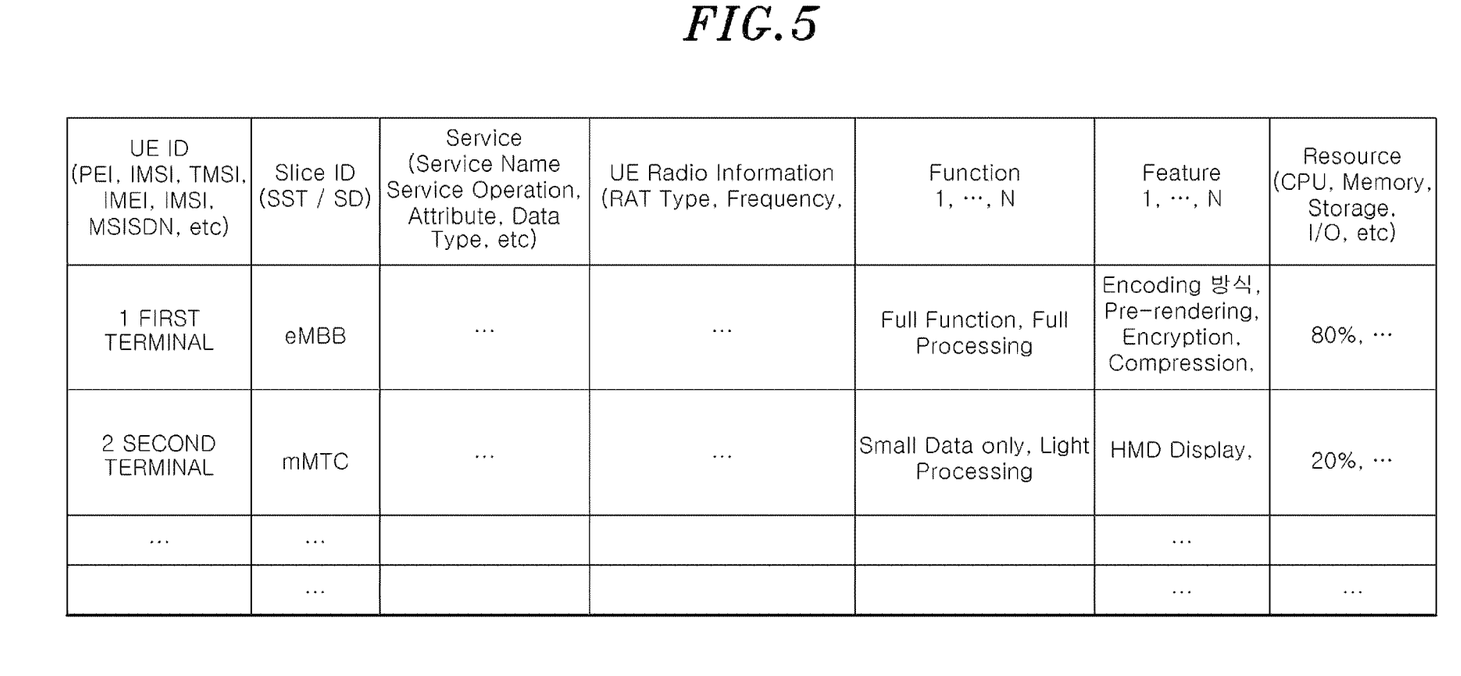
FIG. 5 shows an example of role information according to an embodiment of the present disclosure.

FIG. 5 illustrates an example of how roles are distributed between the first terminal 200 and the second terminal 210 using this method. However, what is illustrated in FIG. 5 is only exemplary, so the idea of the present disclosure is not construed as being limited to FIG. 5. Although role information distributed to the first terminal and the second terminal is described in FIG. 5, the present disclosure is not limited to this.

Referring back to FIG. 4, role information on the roles distributed in S30 is transmitted from the first terminal 200 to the terminal control apparatus 100 (S31).

Then, the operation mode setting unit 120 of the terminal control apparatus 100 sets the operation modes of the terminals 200 and 210 based on the role information received in S31 (S40). Based on this information, the operation modes are set in such a way that the first terminal 200 assumes a main role and the second terminal 210 assumes a sub role, which is referred to as interconnection mode as discussed previously. Accordingly, the operation modes may be set in such a way that the second terminal operates according to cIoT, mMTC communication, MICO (mobile initiated connection oriented), and so on.

Afterwards, the terminal control apparatus 100 communicates with the second terminal 210 only through the first terminal 200, and the second terminal 210 also communicates with the terminal control apparatus 100 only through the first terminal 200.

Thus, when the terminal control apparatus 100 communicates with the SMF/UPF/NFs 500 for PDU session handling (S41), the terminal control apparatus 100 performs an operation for PDU session handling with the first terminal 200 (S42), and performs a predetermined operation with the second terminal 210 only through the first terminal 200 (S43).

As discussed above, according to an embodiment, the first terminal and the second terminal may distribute and perform predetermined roles. In this case, since no radio resources are needed for the second terminal, the first terminal and the second terminal in the 5G system efficiently use radio resources. Besides, in a situation where the second terminal is generally surpassed by the first terminal in terms of resources or processing capabilities that can be offered or in terms of battery performance, some of the original roles of the second terminal may be distributed or transferred to the first terminal. Therefore, the second terminal's limit in resources or capabilities may be overcome or improved.

A connection status between the first terminal 200 and the second terminal 210 may change according to the situation. In some cases, the connection between the first terminal 200 and the second terminal 210 may be disconnected.

Thus, the first terminal 200 periodically monitors its connection to the second terminal 210 (S50). Monitoring results are periodically transmitted in the form of connection status information from the first terminal 200 to the terminal control apparatus 100 (S51).

The connection status information may include an ID for a service app, the importance or QoS of the service app, and so on, as well as information on the type, speed, latency, and load of an interface between the first terminal 200 and the second terminal 210. FIG. 6 illustrates an example of information included in the connection status information.

Referring back to FIG. 4, the PDU session is updated based on the connection status information received in S51 (S52).

For example, if it is determined that the connection between the first terminal 200 and the second terminal 210 is below a predetermined level or is cut off, the PDU session may be updated so that the second terminal 210 does not communicates with the terminal control apparatus 100 through the first terminal 200 any longer, and so that the second terminal 210 communicates directly with the terminal control apparatus 100 or the SMF/UPF/NFs 500.

Then, the terminal control apparatus 100 periodically determines whether or not the first terminal 200 and the second terminal 210 need to be terminated from each other, based on information received from the first terminal 200 as to the connection status between the first terminal 200 and the second terminal 210 and the PDU session updated in S52. If it is determined that they need to be disconnected, the terminal control apparatus 100 sends the first terminal 200 a request to connection termination from the second terminal 210 (S53). In response to this request, the connection between the first terminal 200 and the second terminal 210 is terminated from each other (S60).

Afterwards, the second terminal 210 communicates directly with the terminal control apparatus 100 or with the SMF/UPF/NFs 500, and therefore the PDU session is activated (S70).

Although not shown, the connection status between the first terminal 200 and the second terminal 210 may go back to a predetermined level or above. In this case, the first terminal 200 may transmit information on this connection status back to the terminal control apparatus 100, in which case the first terminal 200 and the second terminal 210 may operate in the "interconnection mode" where they distribute the roles, as explained in S30 to S43.

The foregoing description has been given of how the second terminal 210 is directly connected to the terminal control apparatus 100 when the connection between the first terminal 200 and the second terminal 210 is below a predetermined level or is disconnected. However, the idea of the present disclosure is not limited to this.

Figure 7:
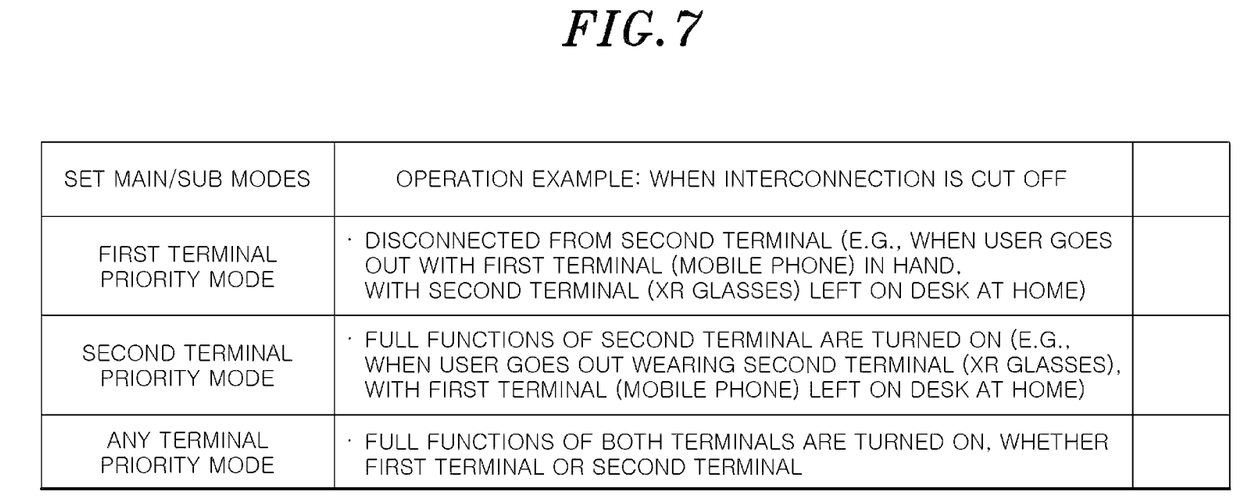
FIG. 7 shows a table of operating mode settings for each terminal according to an embodiment of the present disclosure.

For example, if the connection between the first terminal 200 and the second terminal 210 is below a predetermined level or is disconnected, only the first terminal 200 may perform a main role and the second terminal 210 may not be on the same network as the terminal control apparatus 100 any longer, or else only the second terminal 210 may perform a main role and the first terminal 200 may not be on the same network as the terminal control apparatus 100 any longer, as illustrated in FIG. 7. Otherwise, as described previously, the first terminal 200 and the second terminal 210 each may be individually or independently connected to the same network as the terminal control apparatus 100.

According to an embodiment, the first terminal and the second terminal may distribute and perform predetermined roles. In this case, since no radio resources are needed for the second terminal, the first terminal and the second terminal in the 5G system efficiently use radio resources. Besides, in a situation where the second terminal is generally surpassed by the first terminal in terms of resources or processing capabilities that can be offered or in terms of battery performance, some of the original roles of the second terminal may be distributed with or transferred to the first terminal. Therefore, the second terminal's limits in resources or capabilities may be overcome or improved.

As discussed above, according to an embodiment, the first terminal and the second terminal may distribute and perform predetermined roles. In this case, since no radio resources are needed for the second terminal, the first terminal and the second terminal in the 5G system efficiently use radio resources. Besides, in a situation where the second terminal is generally surpassed by the first terminal in terms of resources or processing capabilities that can be offered or in terms of battery performance, some of the original roles of the second terminal may be distributed or transferred to the first terminal. Therefore, the second terminal's limits in resources or capabilities may be overcome or improved.

Meanwhile, the above-described embodiments may be embodied in the form of a computer readable recording medium storing a computer program programmed to execute each of the steps or in the form of a computer program programmed to execute each of the steps included in this method, stored in a computer-readable recording medium.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A terminal control apparatus comprising:
 a transceiver that obtains information on a first terminal and a second terminal; and
 a processor that makes a predetermined determination in relation to each terminal's user based on the information obtained on the first terminal and the second terminal, that provides a result of the determination to the first terminal, and that, upon receiving role information including information on a role to be performed by the first terminal and information on a role to be performed by the second terminal, sets operation modes of the first terminal and the second terminal based on the received role information, wherein the processor determines whether or not a subscriber of the first terminal and a subscriber of the second terminal are same based on the obtained information.

2. The terminal control apparatus of claim 1, wherein the processor provides terminal information of the second terminal to the first terminal by using the transceiver, in addition to the result of the determination.

3. The terminal control apparatus of claim 1, wherein the processor provides to the first terminal an indication that the first terminal performs a main role and the second terminal performs a sub role by using the transceiver, in addition to the result of the determination.

4. The terminal control apparatus of claim 1, wherein the processor receives ratio information including information on a ratio of resources to be distributed when the first terminal and the second terminal perform roles, by using the transceiver along with role information including information on the role to be performed by the first terminal and information on the role to be performed by the second terminal.

5. The terminal control apparatus of claim 1, wherein the processor sets the operation modes of the first terminal and the second terminal so that the second terminal communicates with the terminal control apparatus through the first terminal, based on the received role information.

6. The terminal control apparatus of claim 1, wherein the obtained information comprises at least one of terminal location, Application ID, slice ID (SST, SD), IMSI (International Mobile Subscriber Identity), SUPI (Subscription Permanent Identifier), GPSI (Generic Public Subscription Identifier), MSISDN (Mobile Station International Subscriber Directory Number), PDU session information, radio capability information, RAT (Radio Access Technology) information, Single/Dual-Registration operation mode, DRX information, and communication interface information.

7. A terminal control apparatus comprising:
a transceiver that obtains information on a first terminal and a second terminal; and
a processor that makes a predetermined determination in relation to each terminal's user based on the information obtained on the first terminal and the second terminal, that provides a result of the determination to the first terminal, and that, upon receiving role information including information on a role to be performed by the first terminal and information on a role to be performed by the second terminal, sets operation modes of the first terminal and the second terminal based on the received role information,
wherein the processor changes the operation modes of the first terminal and the second terminal, based on connection status information received from the first terminal, indicating that a connection status between the first terminal and the second terminal is below a predetermined level.

8. The terminal control apparatus of claim 7, wherein the processor determines whether or not a subscriber of the first terminal and a subscriber of the second terminal are same based on the obtained information.

9. The terminal control apparatus of claim 7, wherein the connection status information is periodically received from the first terminal, and the processor periodically monitors the connection status between the first terminal and the second terminal based on the periodically received connection status information.

10. The terminal control apparatus of claim 7, wherein the changed operation mode of the second terminal comprises an operation mode in which the second terminal communicates with the terminal control apparatus without the medium of the first terminal.

11. The terminal control apparatus of claim 7, wherein the changed operation mode of the second terminal comprises an operation mode in which the second terminal communicates with the terminal control apparatus via a different network from the network the first terminal uses to communicate with the terminal control apparatus.

12. The terminal control apparatus of claim 7, wherein the processor re-changes the operation modes of the first terminal and the second terminal, when the connection status between the first terminal and the second terminal is changed from below the predetermined level to the predetermined level or above.

13. The terminal control apparatus of claim 7, wherein the changed operation mode of the first terminal and the changed operation mode of the second terminal are determined based on a value from a motion sensor comprised in the first terminal or the second terminal.

14. A terminal control method performed by a terminal control apparatus, the terminal control method comprising:
making a predetermined determination in relation to each terminal's user based on information obtained on a first terminal and a second terminal;
providing a result of the determination to the first terminal; and
upon receiving role information including information on a role to be performed by the first terminal and information on a role to be performed by the second terminal, setting operation modes of the first terminal and the second terminal based on the received role information,
wherein the terminal control apparatus determines whether or not a subscriber of the first terminal and a subscriber of the second terminal are same based on the obtained information.

15. The terminal control method of claim 14, wherein terminal information of the second terminal is provided to the first terminal, in addition to the result of the determination.

16. The terminal control method of claim 14, wherein the operation modes of the first terminal and the second terminal are set so that the second terminal communicates with the terminal control apparatus through the first terminal, based on the received role information.

17. The terminal control method of claim 14, wherein the operation modes of the first terminal and the second terminal are changed, based on connection status information received from the first terminal, indicating that a connection status between the first terminal and the second terminal is below a predetermined level.

18. A terminal control method performed by a terminal control apparatus, the terminal control method comprising:
making a predetermined determination in relation to each terminal's user based on information obtained on a first terminal and a second terminal;
providing a result of the determination to the first terminal; and upon receiving role information including information on a role to be performed by the first terminal and information on a role to be performed by the second terminal, setting operation modes of the first terminal and the second terminal based on the received role information, wherein an indication that the first terminal performs a main role and the second terminal performs a sub role is provided to the first terminal, in addition to the result of the determination.

19. The terminal control method of 18, wherein the terminal control apparatus determines whether or not a subscriber of the first terminal and a subscriber of the second terminal are same based on the obtained information.

\* \* \* \* \*